United States Patent
Braganza et al.

(10) Patent No.: US 12,548,227 B2
(45) Date of Patent: Feb. 10, 2026

(54) META VERSE SERVICE CENTER QUEUING USING AN AVATAR

(71) Applicant: Mitel Networks Corporation, Kanata (CA)

(72) Inventors: Jonathan Braganza, Ottawa (CA); Logendra Naidoo, Ottawa (CA)

(73) Assignee: Mitel Networks Corporation, Kanata (CA)

( * ) Notice: Subject to any disclaimer, the term of this patent is extended or adjusted under 35 U.S.C. 154(b) by 153 days.

(21) Appl. No.: 18/510,469

(22) Filed: Nov. 15, 2023

(65) Prior Publication Data

US 2025/0157113 A1      May 15, 2025

(51) Int. Cl.
*G06T 19/00* (2011.01)
*G06T 13/40* (2011.01)

(52) U.S. Cl.
CPC ............ *G06T 13/40* (2013.01); *G06T 19/006* (2013.01)

(58) Field of Classification Search
None
See application file for complete search history.

(56) References Cited

U.S. PATENT DOCUMENTS

| | | |
|---|---|---|
| 2008/0260138 A1 | 10/2008 | Chen et al. |
| 2010/0058183 A1 | 3/2010 | Hamilton, II et al. |
| 2018/0104585 A1 | 4/2018 | Dawson et al. |
| 2019/0306309 A1 | 10/2019 | Deole et al. |
| 2020/0328908 A1 | 10/2020 | Howland et al. |

*Primary Examiner* — Nicholas R Wilson

(57) ABSTRACT

A virtual reality system and method to permit a user to perform various activities in one or more metaverses while waiting in a virtual commerce space can include (1) one or more virtual reality (VR) servers configured to create multiple virtual spaces in one or more metaverses; (2) an avatar library in communication with each of the one or more VR servers; (3) a virtual commerce server in communication with the one or more VR servers and configured to communicate with a plurality of user operating devices, wherein the one or more servers are configured to receive an assistance request, generate an avatar bot as a placeholder in a virtual queue for a user, and transport an avatar of the user to a separate virtual space while the avatar bot represents the user in a virtual queue.

20 Claims, 8 Drawing Sheets

META VERSE SERVICE CENTER QUEUING USING AN AVATAR

FIELD

This disclosure relates to systems, devices, and processes that enable a customer to simultaneously wait in a customer service queue while participating in other metaverse spaces. The systems, devices, and processes could function in a virtual reality ("VR") or metaverse environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may be inventions.

Many companies are beginning to create a presence in the metaverse through virtual stores, which are meant for customers to visit as they would brick and mortar stores. The metaverse is a virtual space in which users can create an avatar and virtually interact with others from essentially any location using devices such as a 3D screen, a VR headset, a mobile phone, or a personal computer (PC). Customer service agents may also choose to operate a device that enables them to enter the metaverse.

In a commerce space within the metaverse, each avatar may be associated with or used to identify a certain person. This means that even though the metaverse is virtual, when a customer visits a metaverse store, unless there is someone such as a virtual customer service agent present who can assist the customer, the customer must wait until a customer service representative (also called an agent, representative, or contact center agent) is available.

While in the metaverse, customers (also called users) may visit a store to speak to a representative about a product or service. As an example, a user could visit a bank in order to obtain help with his/her account or learn about the bank's services. The bank will have representatives that are able to assist the user, but similar to the real world, where there may be a limited number of representatives, there may also be a limited number of metaverse representatives. Thus, the customer may be required to wait in line (virtually) while waiting for a customer service representative or agent. A business may also choose to allow a bot to handle simple customer queries, but if a customer wants to speak directly to an agent, he/she may have to wait. This can lead to frustration and inefficiency, as users are unable to engage in other activities while waiting.

Meeting online (chat or video) is presently limited in its ability to enhance the customer experience, because of, for example, the shortcomings of pretext markup language (HTML) or codecs that are used to increase the clarity of the audio and video. Additionally, call centers primarily focus only on resource management (such as automatic call distribution (ACD) or agent routing) and knowledge management (selecting and/or preparing an agent for the customer call) in tailoring the experience for a customer.

Contact call center systems (or "call centers") may thus equipped to route incoming calls to the proper agents. Interactive voice responses (IVRs) can implement a user-interface design that uses audio prompts. The situational reality, however, at either end of the call remains unchanged; the agent is at a call center with a computer screen and/or phone, and the customer is on his/her computer and/or phone. A metaverse-based customer call center aims to make the customer experience personal and enjoyable. Today, such metaverses are constrained due to static support practices, such as communications between a customer and the customer service center being through a website or telephone call.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
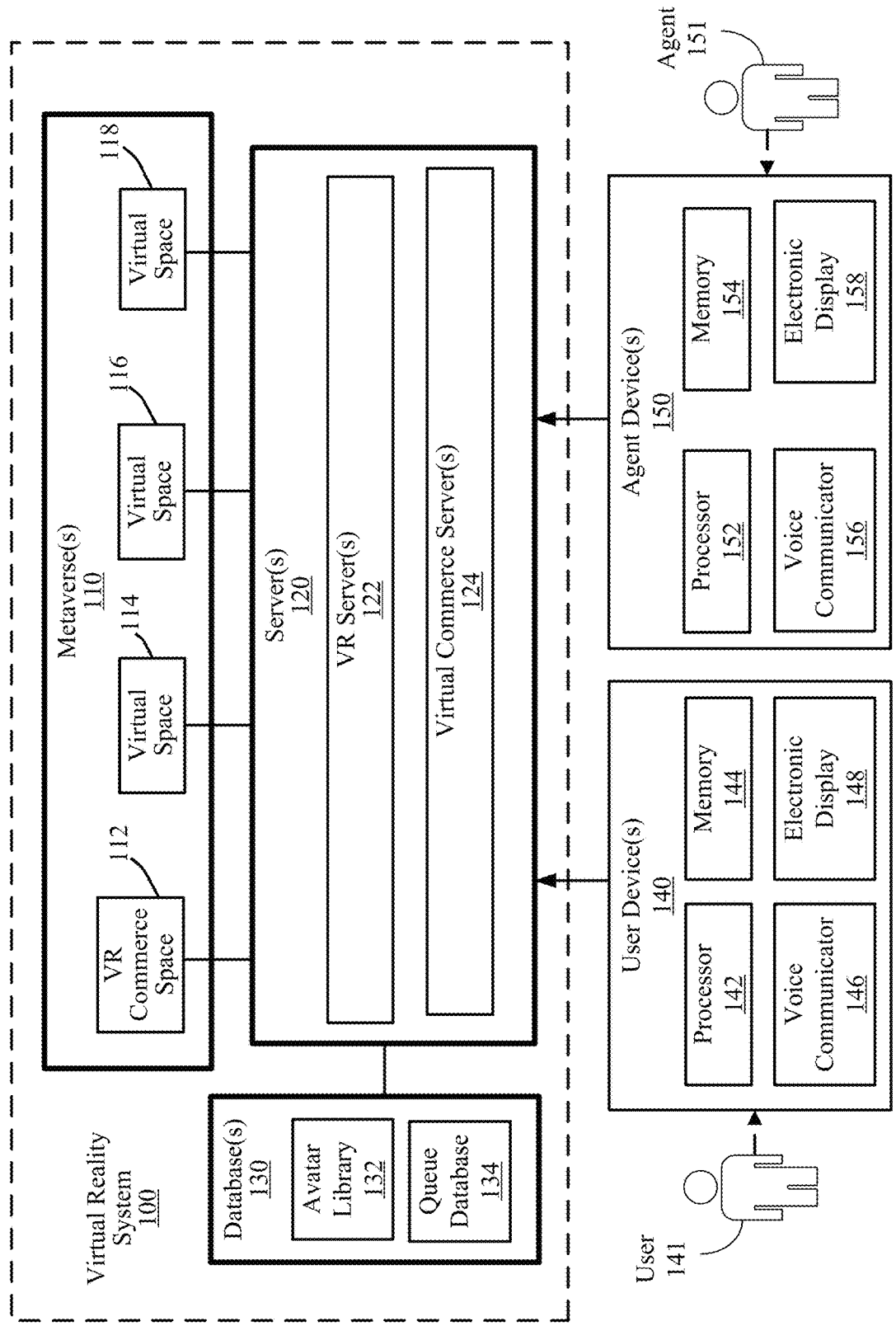
FIG. 1A illustrates a schematic view of a virtual reality system, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Terms and phrases similar to "associate" and/or "associating" may include tagging, flagging, correlating, using a look-up table or any other method or system for indicating or creating a relationship between elements, such as, for example, (i) a presentation account and (ii) an item (e.g., a research article, a written speech, notes on the planned speech, or the like). Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method.

The process flows and screenshots depicted are merely embodiments and, unless otherwise noted, are not intended to limit the scope of the disclosure. For example, the steps recited in any of the method or process descriptions may be executed in any order and are not limited to the order presented. It will be appreciated that the following description makes appropriate references not only to the steps and user interface elements, but also to the various system components as described herein. It should be understood that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) can be stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system disclosed herein may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware-based embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, optical storage devices, magnetic storage devices, and/or the like.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PUP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open-source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PUP, Ruby, and/or PYTHON® programming languages.

For the sake of brevity, data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. As those skilled in the art will appreciate, a user computer may include an operating system (e.g., WINDOWS®, UNIX®, LINUX®, SOLARIS®, MACOS®, etc.) as well as various support software and drivers typically associated with computers.

In various embodiments, the embodiments are directed toward one or more computer systems capable of carrying out the functionalities described herein. The computer system includes one or more processors. The processor is connected to a communication infrastructure (e.g., a communications bus, cross-over bar, network, or the like.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random-access memory (RAM), and may also include a secondary memory. The secondary memory may include, for example, a hard disk drive, a solid-state drive, and/or a removable storage drive. The removable storage drive reads from and/or writes to a removable storage unit. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM), or the like) and associated socket, or other removable storage units and interfaces, which allow software and data to be transferred from the removable storage unit to a computer system.

The terms "computer program medium," "computer usable medium," and "computer-readable medium" are used to generally refer to media such as a removable storage drive and a hard disk installed in a hard disk drive. These computer program products provide software to a computer system.

An "avatar," as referred to herein is a virtual figure configured to represent a user (or an agent) in the metaverse. In this regard, an "avatar" refers to a virtual figure that is user controlled (e.g., through a user device such as a virtual reality headset, virtual reality goggles, or any other method of control), in accordance with various embodiments.

An "avatar bot," as referred to herein is a virtual figure in the metaverse that is controlled by one or more servers (e.g., through one or more processors). In this regard, the "avatar bot," can be configured actively (e.g., to act as an agent, or pre-agent interface, by communicating with users in the metaverse, gather data from users in the metaverse, transmit data to agents in the metaverse, or the like without any control by a human), or passively (e.g., to act as a place-holder in a queue within a virtual store).

A "virtual queue" as referred to herein, is a queue that can be visually seen in a metaverse. For example, the virtual queue can include a plurality of avatars and/or avatar bots forming a line behind a virtual desk in the metaverse, as described further herein. In this regard, a length of the virtual queue can be seen visually by a user.

A "virtual store" as referred to herein is a virtual reality space in the metaverse, where commerce can be conducted. For example, a virtual store can be associated with a business (e.g., a retailer, a service, provider, or the like), and a user can visit the virtual store within the metaverse to conduct commerce, in accordance with various embodiments.

Disclosed herein are systems and methods that utilize an avatar that can wait in line for a user (or alternatively interact with a user) while the user does other preferred activities. Currently, if a user is waiting in line at a virtual store front (e.g., a bank, a retail store, or the like) in the metaverse, the user is forced to wait in line without the ability to leave the virtual store front. Disclosed herein is an avatar bot configured to perform the act of waiting, which is delegated to the avatar bot. In this regard, the avatar can wait in line on behalf of the user, while the user is free to engage in other activities within the metaverse or elsewhere. Accordingly, users can multi-task and make the most of their time in the virtual environment via the systems and methods disclosed herein, in accordance with various embodiments.

While in the metaverse, users may choose to visit a virtual store front to speak to a representative about a product or service. For example, as described above, a user could visit a virtual bank store front to get help with their account, learn about the bank's services, or the like. The bank will have staff who are able to assist the user at the virtual bank store front, but similar to the real world—where there are limited number of staff—the customer may be required to wait in the virtual line while waiting for a free staff member. Accordingly, disclosed herein are systems and methods for utilizing the avatar bot to wait in line for the user, while the user can do other things in the metaverse, such as playing games or visiting other virtual spaces (e.g., virtual store fronts, or any other virtual space in the metaverse, or metaverses). The systems and methods disclosed herein allow the user to spend their time in the metaverse doing other activities until they receive a notification that the avatar bot has reached the front of the queue and a staff member is available (or almost available), in accordance with various embodiments.

Although described herein as remaining within the one or more metaverses while an avatar bot holds a user's place in a virtual queue, the present disclosure is not limited in this regard. For example, if a user has a non-metaverse contact (e.g., a phone number, an email address, or the like) registered with a virtual store front (or registered with an account associated with an avatar of the user), the system can be configured to transmit a message through the non-metaverse contact. In this regard, a user can re-enter the metaverse (e.g., through a user device or in response to selecting a link from the message) once the avatar bot reaches a front of the queue (or near a front of the queue), as described further herein.

Disclosed herein is a technical solution to waiting times in the metaverse at virtual store fronts, by utilizing avatar bots as placeholders in queues. In various embodiments, when a user visits a virtual store front (e.g., a virtual businesses or virtual establishment) in the metaverse via the systems and methods disclosed herein, avatar bots are delegated on behalf of the customer and/or user, while the user is free to participate in other activities within the metaverse. Users still receive VR-based notifications when the avatar bot reaches the front of the queue, allowing them to return to the virtual space and interact with available staff members. Accordingly, a user may experience enhanced efficiency, customer satisfaction, and overall user experience in the metaverse relative to typical systems and methods for operating virtual store fronts in the metaverse.

In various embodiments, the avatar bot, which takes a user's place in line at a virtual store front, can be configured to provide user data to the virtual store front during the waiting. For example, the avatar bot can be configured to indicate a potential grievance of the user, identify a reason for a visit to the virtual store front, provide user specific data, such as age, gender, or the like, and/or provide any additional details that could be beneficial for expediting services, in accordance with various embodiments. In various embodiments, data provided to the virtual store front can be utilized for providing time estimates for the queue, as described further herein.

In various embodiments, the systems and methods disclosed herein can facilitate really simple metaverse transactions. For example, certain transactions in the metaverse may be able to utilize the systems and methods disclosed herein to allow the customer to spend little to no time in the virtual store front (e.g., a metaverse product or service space), but instead the avatar bot of the user can perform simple transactions. For example, a user can provide instructions to an avatar bot, such as "Go in and buy a new 4 TB hard drive from Western Digital. Spend no more than $400. Deliver it by tomorrow to my address." In response to receiving such an instruction, the avatar bot can wait in line and perform the transaction without the user having to switch back to the virtual store front, in accordance with various embodiments.

Disclosed herein is a virtual reality system (e.g., a metaverse environment or the like) where users can create a virtual identity known as an avatar. This avatar can then visit the metaverse and perform various activities, such as play games, explore, or even visit businesses in a similar manner to the real world. Companies are creating or expanding their presence in the metaverse. This involves building "storefronts" on virtual land and creating a virtual space where the user can visit and browse goods virtually, inquire or purchase goods and services, and/or facilitate customer service interactions for troubleshooting or the like.

Like in the real world, the avatars are typically driven by real people (e.g., via a user device or the like), and though a single person can potentially use multiple avatars, they can only deal with so many interactions at a time. Disclosed herein is a method of virtual queueing, which allows customers to visit a store and stand in the queue within a virtual store front in the metaverse. Instead of waiting in the virtual queue and wasting their time, a copy (or alternative) of the user's avatar (e.g., an avatar bot) can be generated to wait in the queue for the user, while the user is free to do other activities in the metaverse. Once the copied (or alternative) avatar (e.g., the avatar bot) reaches the front of the virtual queue, the user can receive a notification informing the user that they can now go back to the store to see a staff member. Alternatively, the user can be automatically transported back to the virtual store front in response to a user reaching a front (or near the front) of the queue. This provides a mechanism to multi-task in the metaverse and ultimately save time and resources for both the customer and business, in accordance with various embodiments.

In various embodiments, via the systems and methods disclosed herein, a user enters a virtual commerce space or any other virtual place of business (i.e., Metaverse), registers in a virtual queue (e.g., to establish identity, preferences for goods/services, or the like), and generates an association between the copied (or alternative) avatar (e.g., the avatar bot) and the user. In various embodiments, once the user joins the virtual queue, the system can be configured to analyze the queue-length and estimate an expected wait time based on factors such as the number of customers ahead, agent availability, and task complexity. In various embodiments, the time estimation can be shared with the user, providing transparency and setting expectations regarding the expected wait time. In various embodiments, a user can receive a notification containing the estimated wait time, allowing the user to plan his or her activities accordingly. In various embodiments, the system can delegate a queue-representative in the form of a customizable avatar (e.g., a copy of a user's current avatar, an alternative avatar, a selected avatar, or the like).

In various embodiments, while the avatar bot is waiting in the queue, the system provides a range of virtual engagement options to keep the user entertained and immersed in the metaverse experience. For example, the engagement options can include, but are in no way limited to: (1) media to allow the user to listen to virtual music, watch videos tailored to the user's interests, live performances, speeches such as Ted Talks, other virtual experiences unique to the metaverse, or the like; (2) virtual games and/or virtual challenges offered to the user; (3) chatting with virtual advocates (e.g., chat-based interactions with users, answer frequently asked questions, provide targeted recommendations, provide personalized assistance, or the like) where bots are integrated into the metaverse environment; (4) social interaction with other users who are also waiting in the virtual queue, another virtual queue, or the like; (5) attend a virtual meeting or a common area; and/or (6) any other metaverse type engagement option that may be apparent to one skilled in the art.

In various embodiments, as the user's delegated avatar (e.g., the avatar bot) approaches the front of the queue and an agent becomes available (or just before an agent becomes available), the user may be notified of the impending transition, the user may be requested to confirm a transition back to the queue or leave the virtual queue, the user may be automatically transitioned back to the store front, or the like. The present disclosure is not limited in this regard. In various embodiments, upon returning to the virtual store front, an agent avatar, which may have been facilitating the engagement and maintaining the user's position in the queue, can initiate the process of engagement with the agent avatar as described further herein.

In various embodiments, the system disclosed herein can include agent avatar bots. For example, an agent avatar bot can be configured to prompt a user for customer specific data. In this regard, the agent avatar bot can be configured to receive customer-data and context associated with a user that is in the virtual queue (or prior to the user entering the virtual queue), so an agent (i.e., a human agent) can utilize the customer specific data to proactively reach out to the user and initiate the engagement process. In this regard, the agent avatar bot can be configured to greet the user, inquire about the user's needs or concerns, and/or gather information associated with the user to expedite the interaction once the user returns to the virtual space to speak with the agent avatar of the human agent.

In various embodiments, the agent avatar bot can establish a sense of commitment by providing the user with a precise timeframe for the estimated wait time. This can be done based on the real-time availability of the human agent and the complexity of the users' requests in front of the user in the virtual queue. In various embodiments, by communicating a more accurate queue time, transparency can be enhanced by the virtual store front and help manage a user's expectations.

In various embodiments, once a user returns to the virtual store front and is ready to proceed, the agent avatar bot can facilitate a seamless handover to an agent avatar representing the human agent. The human agent can receive all the relevant information gathered by the agent avatar (e.g., through an agent device), enabling the human agent to provide personalized and efficient service from the virtual point of contact (i.e., the agent avatar), in accordance with various embodiments. In various embodiments, by implementing the systems and methods disclosed herein, a dynamic avatar queueing system is provided, which can ensure that users are not only able to engage in other metaverse activities while waiting but also receive a high level of virtual assistance through the agent avatar bot prior to being able to speak with the agent avatar.

In various embodiments, the systems and methods disclosed herein provide a mechanism for a user to multi-task in the metaverse and ultimately save time and resources for both the customer and business.

Referring now to FIG. 1A, a schematic view of a virtual reality ("VR") system 100 is illustrated, in accordance with various embodiments. The VR system 100 comprises one or more metaverses 110, one or more servers 120, and one or more databases 130. The VR system 100 is configured to communicate with various user devices and various agent devices. For example, the one or more servers 120 are configured for electronic communication (e.g., wired, wireless, network-based, or the like) with the user device 140 and the agent device 150. In this regard, a user 141 can enter the one or more metaverses 110 via the user device 140 through the one or more servers 120 as described further herein. Similarly, an agent 151 (e.g., an employee, such as a customer service representative, of a business having a VR commerce space 112 within the one or more metaverses 110) can enter the one or more metaverses 110 via the agent device 150 and through the one or more servers 120, as described further herein. In various embodiments, the one or more databases 130 includes an avatar library 132, a queue database 134 (e.g., to store data associated with a virtual queue), and/or any other databases for storing data associated with the one or more metaverses 110 and/or a respective virtual store. In this regard, the avatar library can include one or more avatars for each user of the VR system 100. For example, a user 141 can choose from and/or customize, one or more avatars and store the one or more avatars in the avatar library 132, in accordance with various embodiments.

In various embodiments, the one or more servers 120 includes one or more VR servers 122 and one or more virtual commerce servers 124. In this regard, the one or more VR servers 122 are configured to create multiple virtual spaces (e.g., VR commerce space 112, virtual spaces 114, 116, 118, or the like) within one or more metaverses 110. In various embodiments, the VR commerce space 112 is a virtual store, a virtual service center, or the like. The present disclosure is not limited in this regard. The one or more virtual commerce servers 124 can be in communication with the one or more VR servers 122, or each of the one or more virtual commerce servers 124 can be in direct communication with an associated, or corresponding, VR commerce space 112. The present disclosure is not limited in this regard. The one or more virtual commerce servers 124 is configured to communicate with a plurality of user devices (e.g., in accordance with the user device 140, the agent device 150, or the like). In various embodiments, each of the one or more user devices 140 is associated with a user (e.g., user 141, agent 151, or the like). In various embodiments, a user device (e.g., user device 140, agent device 150, or the like) can be associated with multiple users. In this regard, a user 141 can login to an account, or associated user profile, via the user device (e.g., user device 140, agent device 150, or the like) prior to entering the one or more metaverses 110, and in response to logging in, the user device (e.g., user device 140, agent device 150, or the like) is associated with the user 141 while the user 141 is in the one or more metaverses 110. As described further herein, the one or more virtual commerce servers 124 is configured to position each user 141 into a virtual queue in a first virtual space (e.g., the VR commerce space 112).

In various embodiments, the avatar library 132 in the one or more databases 130 is in electronic communication with each of the one or more servers 120. The avatar library 132 comprises a plurality of avatars. For example, the avatar library 132 can comprise a plurality of avatars for a user (e.g., user 141), and the one or more databases 130 can include an avatar library 132 for each user, in accordance with various embodiments. However, the present disclosure is not limited in this regard. For example, the avatar library 132 can be a database for all users, a set of users, or the like, in accordance with various embodiments.

In various embodiments, the user device 140 includes one or more processors 142, a memory 144, a voice communicator 146, and an electronic display 148. Similarly, the agent device 150 includes one or more processors 152, a memory 154, a voice communicator 156, and an electronic display 158.

In various embodiments, the electronic display 148, 158 can comprise any type of display device for displaying a virtual space (e.g., VR commerce space 112, virtual spaces 114, 116, 118, or the like) within the one or more metaverses 110. For example, the electronic display 148, 158 can comprise a monitor, smart glasses, a tablet, a VR headset, or the like. The present disclosure is not limited in this regard. In various embodiments, the electronic display 148, 158 is configured to display a graphical user interface (GUI) (e.g., prior to entering the one or more metaverses). In various embodiments, after entering the one or more metaverses, the GUI (e.g., GUI 302 as shown in FIGS. 3-7) is configured to display the one or more metaverses 110, in accordance with various embodiments. In various embodiments, the GUI is in operable communication with the one or more servers 120. In this regard, a user 141 can provide various inputs to the one or more servers 120 through the GUI prior to entering, or while within, the one or more metaverses 110.

Figure 1B:
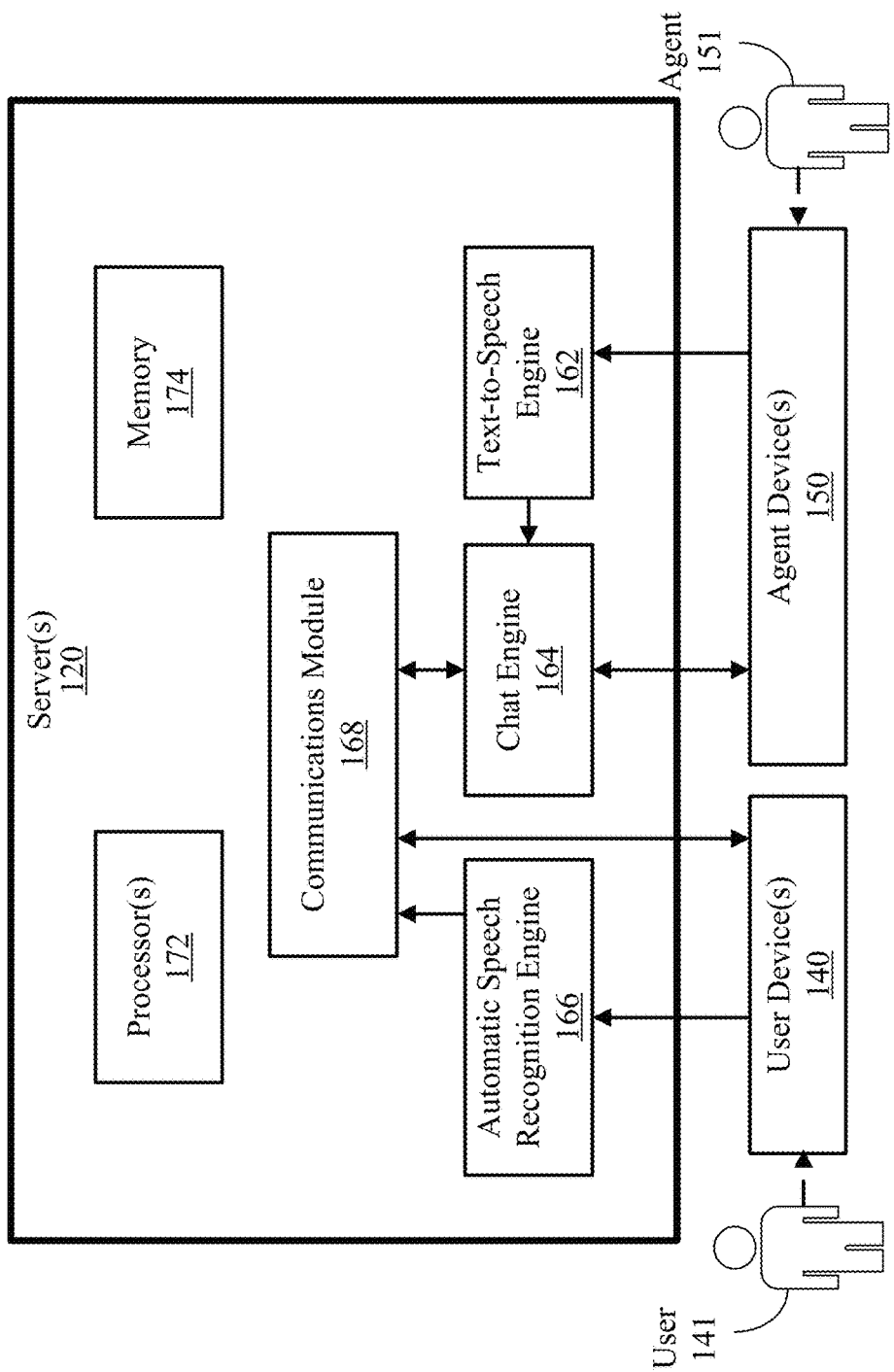
FIG. 1B illustrates a schematic view of interactions between devices and one or more servers of the virtual reality system, in accordance with various embodiments.

With combined reference now to FIG. 1B, a schematic view of the one or more servers 120 from FIG. 1A interacting with the user device 140 and the agent device 150 is illustrated, in accordance with various embodiments. With combined reference to FIGS. 1A and 1i, the user 141 can interact with the agent 151 through a communications module 168 of the one or more servers 120. In various embodiments, the communications module 168 can comprise a computing device that is programmed to (1) identify and answer some customer questions in order to provide more available time for the agent 151, and/or (2) interject typical speech-related nuances to the user device 140 in order to simulate actual conversation if the agent 151 is engaged in another communication or otherwise distracted. For example, the communications module 168 can comprise a speech generator that is configured facilitate a registration of a user 141 within a virtual queue. In this regard, the speech generator can be configured to ask questions to identify a user 141, determine a reason for a user's visit, and/or determine preferences for a user 141. For example, the communications module 168 can be configured to ask questions, such as "what is your name?" or "what is the reason for your visit?" or "what type of activities do you prefer in the metaverse?" or the like. In this regard, the communications module 168, which can be facilitated through an agent avatar (or an agent avatar bot) with or without interaction from the agent 151, can be configured to perform an on-boarding/registration process for a user 141 in order for the user 141 to enter the virtual queue, as described further herein.

Communications module 168 as shown can be a part of the one or more VR servers 122 and/or the one or more virtual commerce servers 124 from FIG. 1A, in accordance with various embodiments. Communications module 168 can also have an artificial intelligence component that learns the answers to customer questions by comparing questions asked and agent's answers over time, in accordance with various embodiments. In various embodiments, the communications module 168 can be configured to recognize a user 141 has been previously registered. In this regard, after an initial registration with the communications module 168 at a respective VR commerce space 112 from FIG. 1A, a user 141 may not have to re-register upon entering the VR commerce space 112 again. In various embodiments, the communications module 168 can include a chat monitor. The chat monitor can detect gaps in the agent's speech for the communications module 168 to fill, in accordance with various embodiments.

In various embodiments, the user 141 can communicate with the communications module 168 through an automatic speech recognition engine (ASR) 166. For example, voice communicator 146 of the user device 140 from FIG. 1A can be converted to text by the automatic speech recognition (ASR) engine 166. Although illustrated as being a part of the one or more servers 120, the ASR engine 166 can be a separate device from the one or more servers 120 and still be within the scope of this disclosure. Text generated by the ASR engine 166 can be communicated by the one or more VR servers 122, the one or more virtual commerce servers 124, or the like to chat engine 164 (e.g., through the communications module), which communicates the text to the agent device 150. In various embodiments, the initial interactions between the user 141 and the communications module 168 may not be transmitted to the agent device 150 until a user 141 has reached the front of a virtual queue (i.e., once a user 141 begins interacting with the agent 151), as described further herein. However, the present disclosure is not limited in this regard, and an agent device 150 can be configured to receive information immediately upon the user 141 interacting with the communications module 168.

In various embodiments, the chat engine 164 is configured to transmit text received and/or generated from the communications module 168 to the agent device 150. In this regard, the chat engine 164 can be configured to generate chat room, or chat space specific to, and associated with, a user 141, in accordance with various embodiments. In various embodiments, the chat room or chat space can remain with a user 141 until a specific agent is assigned to the user 141. In this regard, any communications between the user 141 and the communications module 168 can be provided to the agent 151 upon the agent 151 being assigned to the user 141 as described further herein.

In various embodiments, the one or more servers 120 includes a text-to-speech engine (TTS) 162. The TTS engine 162 can be configured to convert text generated by agent device 150 via chat engine 164 into speech and transmits the speech to the communications module 168, which then transmits the speech to the user device 140 where customers can hear the speech. In this regard, an agent 151 can communicate with users in a virtual queue via text, while assisting another customer, in accordance with various embodiments.

In various embodiments, the one or more servers 120 can comprise one or more processors 172. The one or more servers 120 can be integrated into a computer system (e.g., in processor and/or memory). In various embodiments, the one or more servers 120 can be configured as a central network element or hub to various systems and components of the VR system 100 from FIG. 1A. In various embodiments, the one or more servers 120 may comprise a processor 172. In various embodiments, one or more servers 120 be implemented as a single processor 172 and associated memory 174. In various embodiments, the one or more servers 120 may be implemented as one or more processors 172 and/or memories 174 (e.g., a main processor and local processors for various components, a decentralized network of main processors, or the like). The one or more servers 120 may comprise one or more processors 172 configured to implement various logical operations in response to execution of instructions, for example, instructions stored on a non-transitory, tangible, computer-readable medium (e.g., memory 174) configured to communicate with the user device 140 and/or the agent device 150, in accordance with various embodiments.

Figure 2:
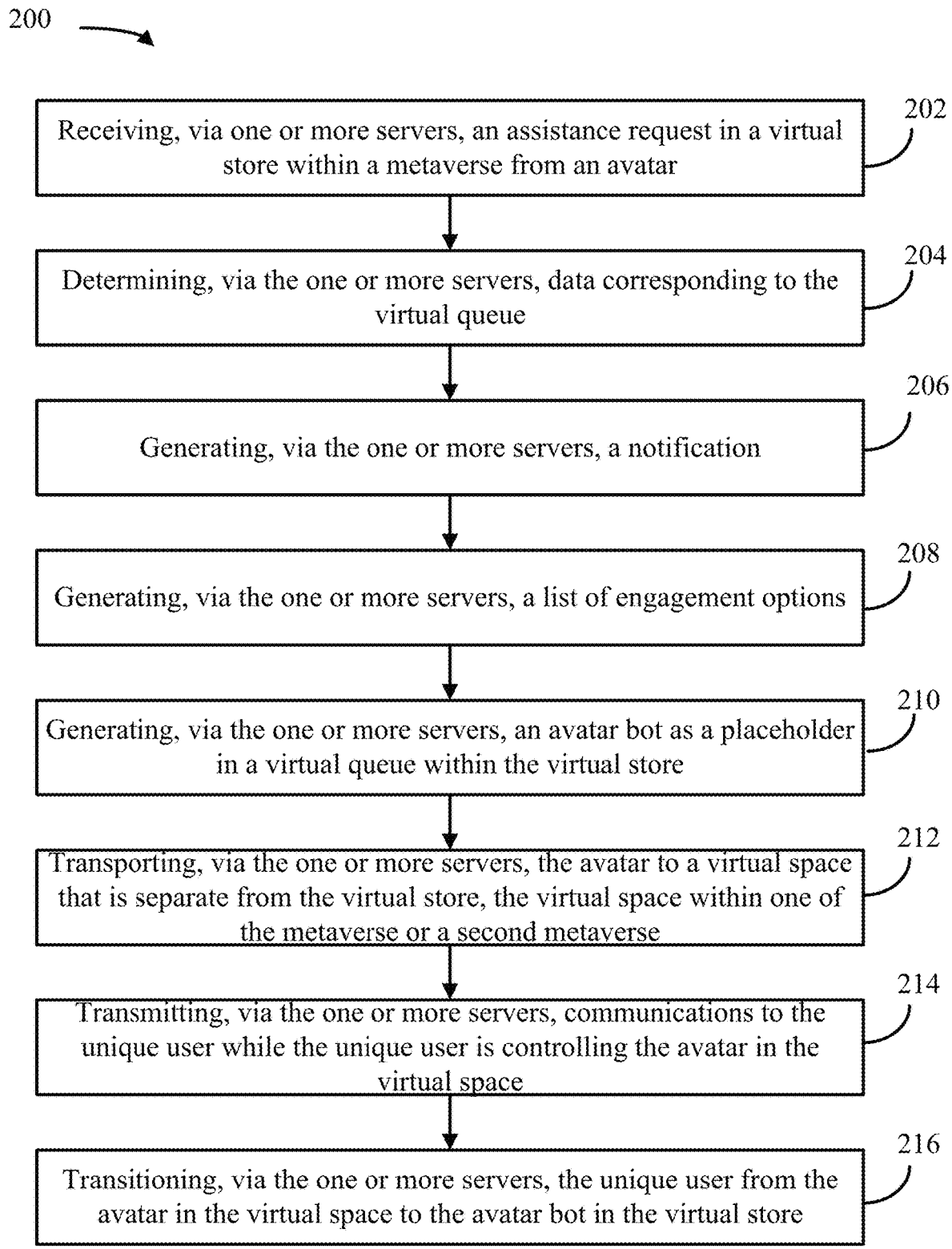
FIG. 2 illustrates a process performed by the virtual reality system of FIG. 1A, in accordance with various embodiments.
Figure 3:
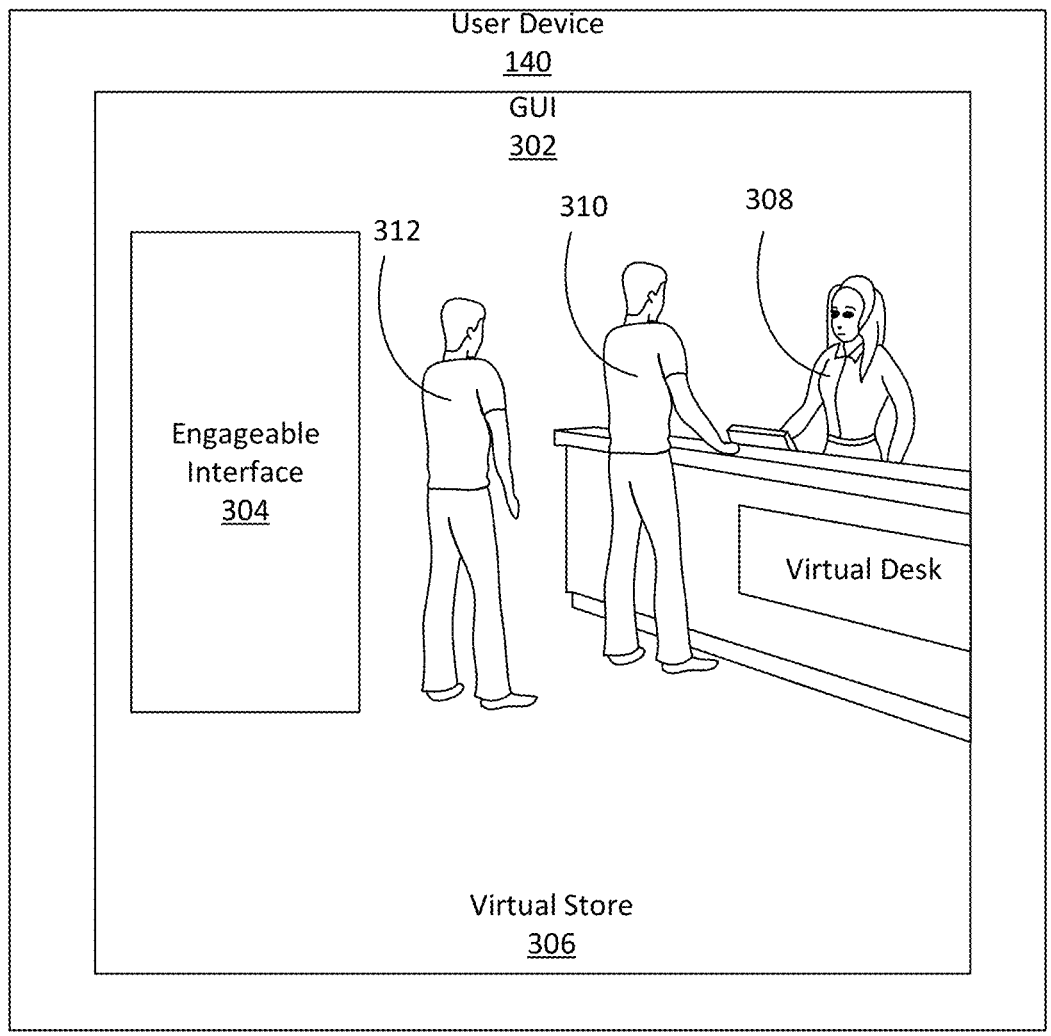
FIG. 3 illustrates a graphical user interface on a user device during the process of FIG. 2.

Referring now to FIG. 2, a process 200 performed via the VR system 100 from FIG. 1A (e.g., by the one or more servers 120 from FIGS. 1A and 1B) is illustrated, in accordance with various embodiments. With combined reference now to FIGS. 1A, 1i, and 2, the process 200 comprises receiving, via one or more servers 120 (e.g., through one or more processors 172), an assistance request in a virtual store (e.g., VR commerce space 112) within a metaverse of the one or more metaverses 110 from an avatar (step 202). In various embodiments, the avatar is controllable by a user 141 through a user device 140 as described previously herein (e.g., via a virtual reality headset, virtual reality goggles, or the like). With brief reference now to FIG. 3, a user can enter a virtual store 306 (e.g., a VR commerce space 112 from FIG. 1A). In the virtual store 306, a user 141 can see through a graphical user interface (GUI) 302 one or more agent avatars 308, one or more customer avatars (e.g., avatars 310, 312), and an engageable interface 304. The customer avatars (e.g., avatars 310, 312) can be avatar bots or avatars. For example, a user 141 can choose to wait in the virtual queue with the avatar that is controllable by the user 141 if the user 141 desires (e.g., if the virtual queue is relatively short, or the like).

An "engageable interface" (e.g., engageable interface 304) as referred to herein can include an engageable agent avatar (e.g., an agent avatar bot), a selectable notification (e.g., a plus sign to indicate a user wants to be added to the virtual queue, a selectable message such as a message with an estimated wait time, or the like), or any other engageable interface configured to facilitate an assistance request in accordance with step 202 of process 200. In this regard, in response to a user 141 engaging with the engageable interface 304, the user 141 can be placed in the virtual queue, as described further herein.

In various embodiments, the engageable interface 304 can comprise an agent avatar bot or an agent avatar 308. For example, in various embodiments, the process 200 can further comprise transmitting, via the one or more processors 172, communications (e.g., from the agent or automatically via the one or more servers 120), at the engageable interface 304 and through an agent avatar 308 (or agent avatar bot) to the user 141 while the user 141 is controlling the avatar in the virtual store 306. In this regard, an agent avatar 308 (or an agent avatar bot) can ask preliminary questions for registration purposes at the engageable interface 304, answers to the questions can be recorded or transcribed (e.g., via the ASR engine 166 and/or the communications module 168), and the answers can be provided to the agent 151 through the chat engine 164, in accordance with various embodiments. In various embodiments, the registration process can include an on-boarding process to establish an identity of the user 141, preferences for goods/services for the user 141, or the like. In various embodiments, the registration process can ensure that the avatar bot that is generated for the user 141 in step 210 is associated with an account (or profile) of the user 141 and can accurately represent the user 141 while waiting in the virtual queue.

In various embodiments, through the engageable interface 304, the one or more servers 120 can query each user 141 in the virtual queue for information from an agent avatar bot and determine an estimated wait time based on data received from the query of each user 141 in the virtual queue. In this regard, the engageable interface 304 can be used to facilitate data collection to generate a more accurate and/or precise estimate of a wait time, provide an agent 151 with data related to a customer's specific needs, or the like, in accordance with various embodiments. Although described herein as having the agent avatar bot interacting with the user 141, the present disclosure is not limited in this regard. For example, based on data that the user 141 provides to the avatar bot associated with the user 141, the avatar bot can communicate (i.e., transfer) the user specific data to the avatar bot to facilitate reduce interactions that the user 141 has to perform to enter the virtual queue, in accordance with various embodiments.

In various embodiments, the process 200 further comprises determining, via one or more servers 120 (e.g., through one or more processors 172), data corresponding to the virtual queue (step 204). In various embodiments, the data can include an estimated wait time to speak to an agent 151, a number of customers in front of the user 141 in the virtual queue, a range for an estimated wait time, or the like. The present disclosure is not limited in this regard. In various embodiments, the estimated wait time is based on at least one of a number of customers ahead in the virtual queue, a number of agents available, and an estimated task complexity (e.g., for customers that are ahead in the queue), or the like. In various embodiments, the calculating the estimated wait time can be improved over time. For example, the one or more servers 120 can include a machine learning or artificial intelligence engine (or module) that is configured to utilize data received in a virtual store front to modify how the estimated wait time is calculated to produce more accurate estimated wait times over time. In various embodiments, the one or more servers 120 (e.g., through one or more processors 172) is configured to generate a display of the estimated wait time prior to the generating an avatar bot in step 210 as described further herein. In this regard, the user 141 can determine whether the user 141 wants to enter the virtual queue based on the estimated wait time, in accordance with various embodiments.

Although described herein as providing the estimated wait time prior to entering a virtual queue, the present disclosure is not limited in this regard. For example, the estimated wait time can be generated after the user 141 enters the virtual queue and still be within the scope of this disclosure. In various embodiments, the estimated wait time can allow the user to plan activities within the one or more metaverses 110 accordingly. In this regard, although described as transporting the user 141 to a specific virtual space selected by the user 141, the present disclosure is not limited in this manner. For example, a user 141 can travel between multiple virtual spaces (e.g., virtual space 114 to virtual space 116, or the like) while the avatar bot represents the user 141 in the virtual queue, as described further herein. Accordingly, a user 141 can visit as many virtual spaces as the user 141 desires while the avatar bot holds a place for the user 141 in the virtual queue, in accordance with various embodiments.

Figure 4:
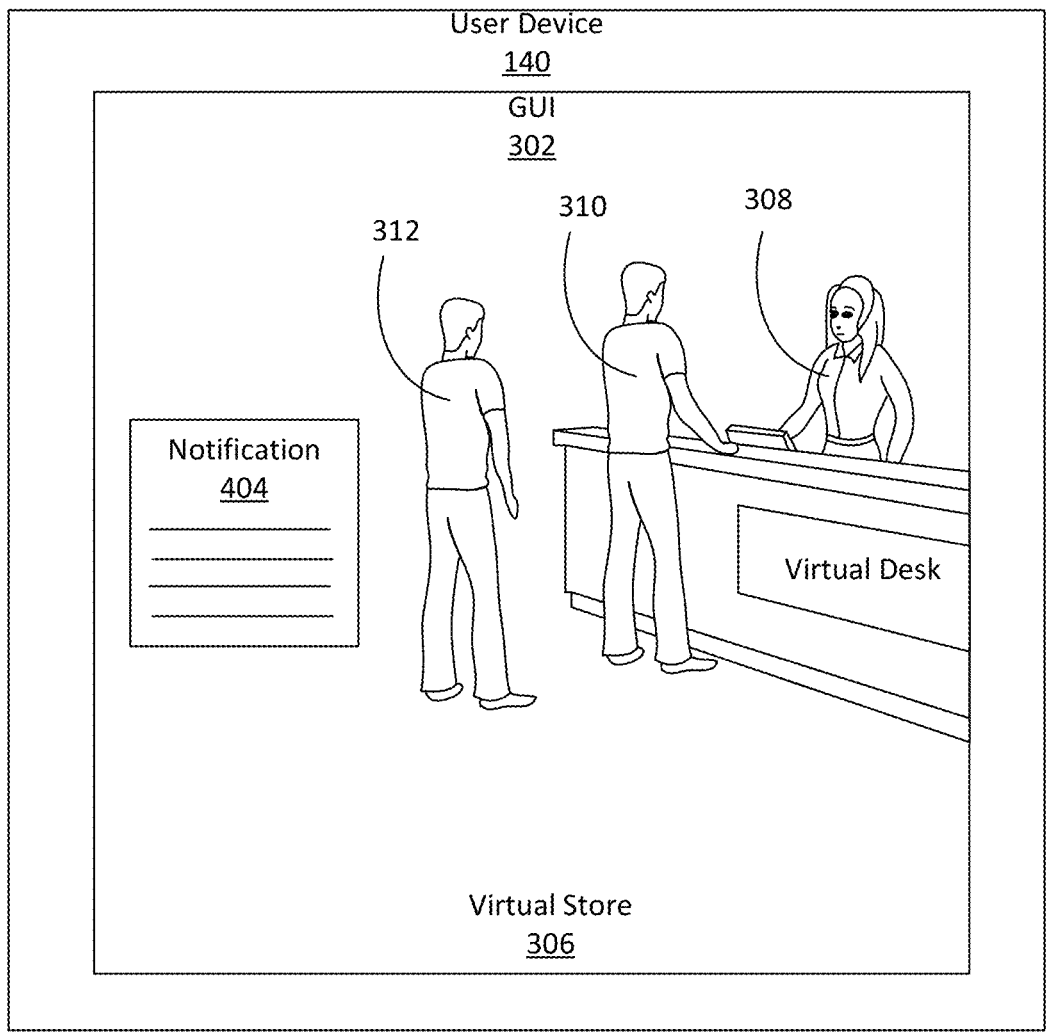
FIG. 4 illustrates a graphical user interface on a user device during the process of FIG. 2.

In various embodiments, with combined reference now to FIGS. 2 and 4, the one or more servers 120 can be configured to generate a notification 404 (step 206). In various embodiments, the notification 404 can include the estimated wait time determined in step 204. In various embodiments, the notification 404 can be incorporated into the engageable interface 304 from FIG. 3. Stated another way, an estimated wait time can be displayed at the engageable interface 304 prior to a user engaging the engageable interface 304. In this regard, a user 141 can make a determination on whether or not to enter the virtual queue prior to engaging with the engageable interface 304, in accordance with various embodiments. In various embodiments, the notification of step 206 can be a confirmation that a user 141 has entered the virtual queue (i.e., instead of, or in addition to, the estimated wait time for the user 141). The present disclosure is not limited in this regard, and various types of information can be communicated to the user 141 through the notification 404 from FIG. 4 and be within the scope of this disclosure.

In various embodiments, the process 200 can further comprise receiving, via the one or more servers 120 (e.g., through the one or more processors 172), a confirmation from the user 141 that the user 141 agrees to be placed in the virtual queue after the notification is generated in step 206 and prior to transporting the avatar to the virtual space in step 212 as described further herein. In various embodiments, the confirmation can be received via an acceptance of a prompt from the user 141. In this regard, a user 141 may have to confirm whether the user 141 desires to be placed in the virtual queue, and based on the confirmation, the remaining steps of the process 200 are automatically performed, in accordance with various embodiments. In various embodiments, the process 200 can further receive, via the one or more servers 120 (e.g., through the one or more processors 172), registration information associated with the user 141 in response to receiving the confirmation, the registration information configured to associate the user 141 with an avatar bot placed in the virtual queue in accordance with step 210 and the avatar is transported to a virtual space in step 212. In various embodiments, the registration information can be received automatically in response to a user 141 confirming that the user 141 desires to be placed in the virtual queue. In various embodiments, the registration information is entered by the user 141 (e.g., vocally through the ASR engine 166, or the like). In various embodiments, the registration information is received in response to queries from an agent avatar 308 (or an agent avatar bot). In various embodiments, responsive to the user 141 accepting a prompt that is generated in step 206 (or after step 206) to confirm the user 141 desires to enter the virtual queue, the transporting step 212 is automatically performed as described further herein.

Referring back to FIGS. 1A, 1, and 2, the process 200 can further comprise generating, via one or more servers 120 (e.g., through one or more processors 172), a list of engagement options (step 208). In various embodiments, the list of engagement options can be displayed, and may be selectable, through the notification 404 as shown in FIG. 4. In this regard, in response to a user 141 engaging the engageable interface 304 from FIG. 3, the one or more servers 120 can generate the notification 404 with the list of engagement options through the GUI 302. As described previously herein, the engagement options can include, but are not limited to, any of the following: (1) any form of media (e.g., virtual music, videos, live performances, real-time speeches, previously recorded speeches such as Ted Talks, and/or other virtual media experiences unique to the metaverse); (2) virtual games (e.g., virtual board games, virtual video games, virtual challenges, or the like); (3) virtual social engagement (e.g., virtual advocates chat space, metaverse frequently asked questions space, a community space with community recommendations based on user's interests, or the like); (4) a community space for user's waiting in a virtual queue; (5) virtual meeting or conference spaces; and/or (6) any other metaverse type engagement option that may be apparent to one skilled in the art. In various embodiments, responsive to receiving a selection from the list of engagement options in step 208, the one or more servers 120 (e.g., through via the one or more processors 172) can transport the avatar to the virtual space having a selected engagement option (e.g., virtual space 114, 116, 118) from the list of engagement options.

In various embodiments, a user 141 can set preferences for engagement options based on estimated wait times. For example, if a wait time is between five minutes and ten minutes and a user prefers a wait time in this range, such as a game of checkers or another relatively short game, the preferred engagement option can be automatically selected. In various embodiments, a preferred engagement option can be highlighted (or identified in any type of manner) by the system. In various embodiments, the preferred engagement option can correspond to a user preference, a prior selection by a user 141, a most common selection by users for an estimated time period, or the like. The present disclosure is not limited in this regard.

In various embodiments, the process 200 further comprises generating, via one or more servers 120 (e.g., through one or more processors 172), an avatar bot as a placeholder in the virtual queue within the virtual store (step 210), and transporting, via one or more servers 120 (e.g., through one or more processors 172), the avatar to a virtual space (e.g., virtual space 114, 116, 118) that is separate from the virtual store (e.g., VR commerce space 112), the virtual space within one of the metaverse or a second metaverse (step 212). In various embodiments, the virtual store (e.g., VR commerce space 112) and the virtual space 114, 116, 118 are configured to operate simultaneously. In various embodiments, the avatar is controllable by the user 141 while the avatar bot holds the place in the virtual queue in the virtual store. For example, with brief reference to FIG. 5, the avatar bot 314 can be configured as a placeholder in the virtual queue within the virtual store 306. In this regard, the virtual queue is associated with a visual display of a queue (i.e., an order of customers) waiting to be attended to (i.e., to engage with), an agent (e.g., agent avatar 308). Once the avatar bot 314 is placed in the virtual queue, the one or more servers 120 (e.g., via the one or more processors 172 from FIG. 1B) can transport the avatar to a separate virtual space 316. In various embodiments, the avatar can be transported with a transition effect. However, the present disclosure is not limited in this regard, and transportation of the avatar without a transition effect is within the scope of this disclosure. In various embodiments, the avatar bot 314 that remains in the virtual store 306 is controlled by the one or more servers 120. With brief reference now to FIG. 6, the virtual space 606 can be in accordance with a selected engagement option. In this regard, the user can be placed in a virtual art gallery in response to selecting a virtual art gallery as an engagement option. In various embodiments, while the user is in the virtual space 606, the GUI 302 may provide a status indicator 604 corresponding to the virtual queue with the avatar bot 314 from FIG. 5. In various embodiments, the status indicator 604 can include a place in the virtual queue (e.g., third in line or the like), an estimated wait time, a miniaturized display of the virtual queue, communications with an agent while in the virtual queue, or the like. The present disclosure is not limited in this regard.

In various embodiments, the process 200 can further comprise transmitting, via one or more servers 120 (e.g., through one or more processors 172), communications to the user 141 (step 214). In various embodiments, the communications can be from the agent 151 (e.g., via the chat engine 164 and through the status indicator 604 or any other method of delivery). In various embodiments, the communications can be auditory or text. In this regard, while the user is in the virtual space 606, the agent 151 can gather additional data from the user 141 as needed or desired based on data that was initially received in the registration step to facilitate a smooth interaction once the agent 151 becomes available, in accordance with various embodiments.

In various embodiments, the communications in step 214 can be automatically generated as opposed to being initiated by the agent 151. For example, the process 200 can further comprise determining, via the one or more servers 120 (e.g., through the one or more processors 172), an agent 151 will be available within an estimated time threshold (or within a threshold number of customers). In various embodiments, the one or more servers 120 (e.g., through the one or more processors 172) can prompt the user 141 in the virtual space 606 from FIG. 6 in response to the determining step, and the transitioning step 216 can be automatically performed in response to a user 141 confirming that the user 141 desires to be transported back to the virtual store 306 from FIG. 5.

In various embodiments, the transitioning step can occur automatically, without a prompt. In various embodiments, a notification can be generated and displayed to the user 141 in the virtual space 606 (e.g., via the status indicator and/or as a pop-up notification). In various embodiments, the notification can include a message associated with an impending transition. In this regard, a user 141 can be notified, while the transition can still be configured to occur automatically, in accordance with various embodiments. The present disclosure is not limited in this regard. For example, performing the step of the transitioning (e.g., step 216 as described further herein) from the avatar in the virtual space 606 from FIG. 6 to replace the avatar bot 314 in the virtual store 306 from FIG. 5 can occur automatically in response to an estimated time falling below the estimated time threshold (or a number of customers in front of the user 141 in the virtual queue falling below a threshold number of customers).

Figure 5:
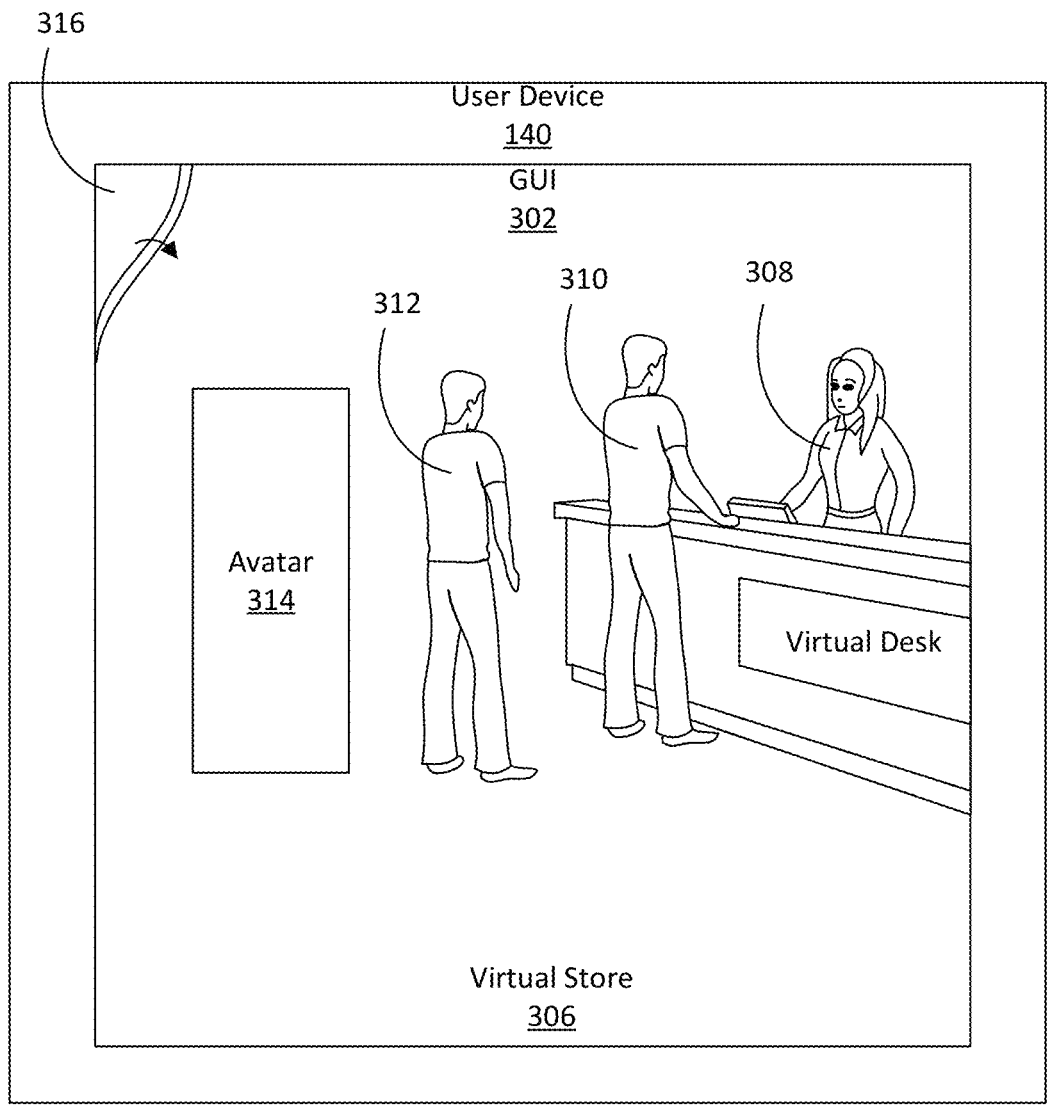
FIG. 5 illustrates a graphical user interface on a user device during the process of FIG. 2.
Figure 6:
FIG. 6 illustrates a graphical user interface on a user device during the process of FIG. 2.
Figure 7:
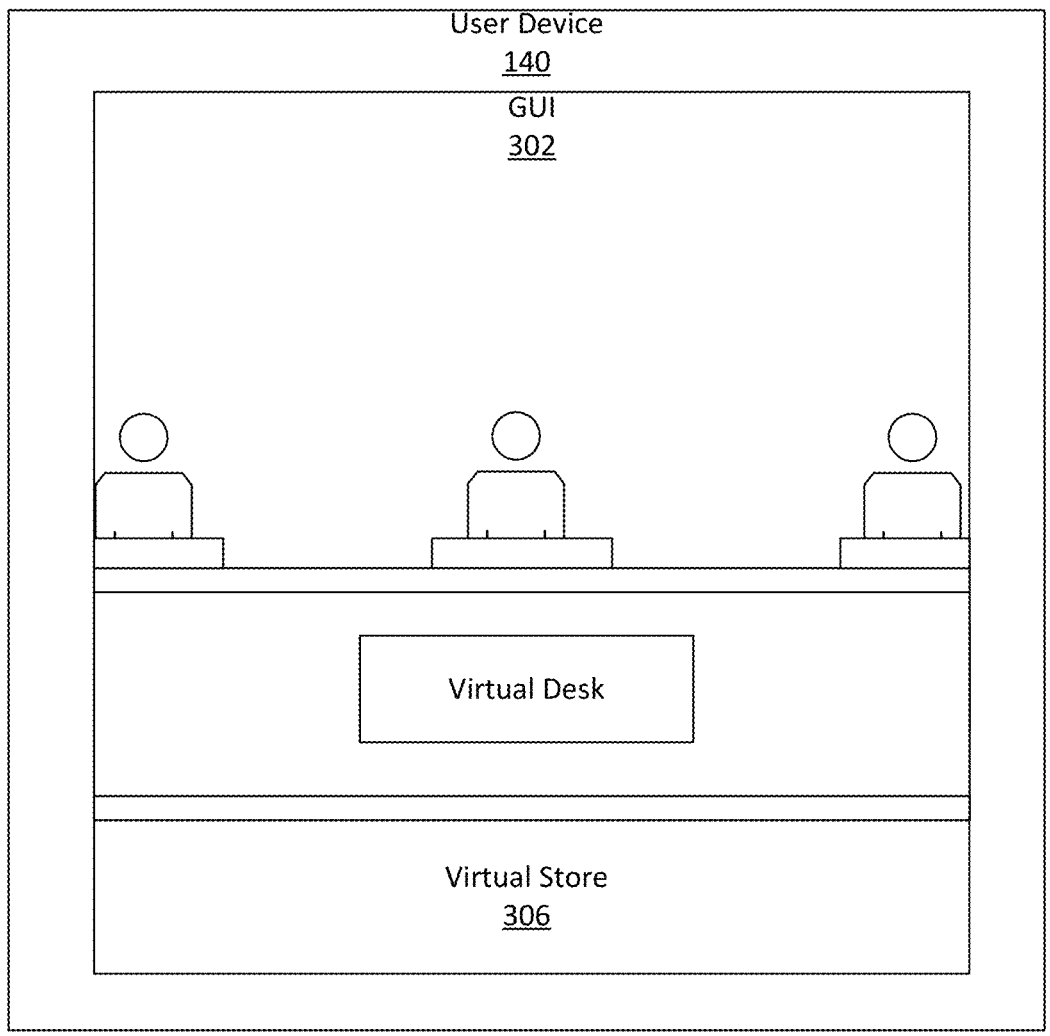
FIG. 7 illustrates a graphical user interface on a user device during the process of FIG. 2.

In various embodiments, the process 200 further comprises transitioning, via one or more servers 120 (e.g., through one or more processors 172), the avatar from the virtual space 606 from FIG. 6 to the virtual store 306 from FIG. 5 in response to one of the agent (e.g., agent 151) or a second agent (e.g., another agent 151) being available or estimated as being available within a threshold period of time (e.g., 5 minutes, 3 minutes, 1 minute, 30 seconds, or the like) (step 216). In various embodiments, step 216 can be facilitated in response to a status in the virtual queue, as opposed to a time until available estimation. For example, once a user 141 is next in the virtual queue (i.e., the user 141 will see the next available agent 151), the user 141 can be transitioned back to the virtual store 306 from FIG. 5 and replace the avatar bot 314 with the avatar, in accordance with various embodiments. In various embodiments, the avatar that is transitioning back to the virtual store can replace the avatar bot, merge with the avatar bot, or the like. The present disclosure is not limited in this regard.

In various embodiments, the transitioning step 216 can occur automatically, without a prompt, in response to a user 141 being inactive after being transported to a virtual space 606 from FIG. 6 in step 212. For example, the one or more servers 120 (e.g., through the one or more processors 172), can be configured to periodically, or continually, check whether a user 141 has been active for longer than a threshold period of time (e.g., 10 seconds, 30 seconds, 1 minute, 2 minutes, or the like) after the user has been transported to the virtual space 606 from FIG. 6. In response to an inactivity time exceeding the threshold, the one or more servers 120 (e.g., through the one or more processors 172), can be configured to automatically transition the user 141 back from the virtual space 606 from FIG. 6 into the virtual queue within the virtual store 306 from FIG. 5 as described previously herein.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. A virtual reality system comprising:
    one or more virtual reality (VR) servers configured to create multiple virtual spaces within one or more metaverses;
    a virtual commerce server in communication with the one or more VR servers and configured to communicate with a plurality of user devices; and
    an avatar library in communication with each of the one or more VR servers and the virtual commerce server, wherein the avatar library comprises a plurality of avatars, wherein one of the one or more VR servers or the virtual commerce server is configured to:
        receive an assistance request in a first virtual space within the one or more metaverses from a user,
        generate an avatar bot from the plurality of avatars for the user, the avatar bot being a virtual figure configured to represent the user in the first virtual space and to hold a place in a virtual queue in the first virtual space, the virtual queue being a queue that is visually seen in the first virtual space; and
        transport an avatar from the plurality of avatars for the user to a second virtual space within the one or more metaverses, the avatar controllable by the user while the avatar bot holds the place in the virtual queue in the first virtual space.

2. The virtual reality system of claim 1, wherein one of the one or more VR servers or the virtual commerce server is further configured to:
    determine an estimated wait time in the virtual queue; and
    generate a display of the estimated wait time to the user prior to the generating the avatar bot.

3. The virtual reality system of claim 1, wherein one of the one or more VR servers or the virtual commerce server is further configured to generate a list of engagement options, and responsive to receiving a selection from the list of engagement options by the user, transporting the avatar to the second virtual space having a selected engagement option from the list of engagement options.

4. The virtual reality system of claim 1, wherein one of the one or more VR servers or the virtual commerce server is further configured to:
    determine one of a remaining estimated wait time is below a threshold wait time or an agent is available; and
    generate a notification to the user.

5. The virtual reality system of claim 4, wherein the notification includes a message associated with an impending transition.

6. The virtual reality system of claim 4, wherein one of the one or more VR servers or the virtual commerce server is further configured to transition the user from the avatar in the second virtual space to replace the avatar bot in the first virtual space.

7. The virtual reality system of claim 6, wherein the transition of the user from the avatar to replace the avatar bot is responsive to determining one of the agents is available, the agent is estimated to be available within a threshold period of time, or a number of customers ahead of the user in the virtual queue is less than a threshold number of customers.

8. The virtual reality system of claim 1, wherein one of the one or more VR servers or the virtual commerce server is further configured to:
    query the user for information from an agent avatar bot; and
    determine an estimated wait time based at least in part on data received from the query of the user.

9. The virtual reality system of claim 1, wherein the first virtual space and the second virtual space are configured to operate simultaneously.

10. A method for metaverse queuing in a commerce space within one or more metaverses, wherein the one or more metaverses includes multiple virtual spaces, wherein each of the multiple virtual spaces is configured to permit a plurality of avatars to simultaneously interact with each other inside of at least one of the multiple virtual spaces, the method comprising steps of:
    using one or more virtual reality (VR) servers, a virtual commerce server, or one or more user operating devices, to create the multiple virtual spaces within the one or more metaverses;
    receiving an assistance request in a first virtual space within the one or more metaverses from a user, the first virtual space associated with a virtual store within the one or more metaverses;
    generating an avatar bot for the user, the avatar bot being a virtual figure configured to represent the user in the first virtual space and to hold a place in a virtual queue in the first virtual space, the virtual queue being a queue that is visually seen in the first virtual space; and
    transporting an avatar from the plurality of avatars for the user to a second virtual space within the one or more metaverses, the avatar controllable by the user while the avatar bot holds the place in the virtual queue in the first virtual space.

11. The method of claim 10, wherein there is one VR server and the one VR server creates the multiple virtual spaces.

12. The method of claim 10, further comprising generating a list of engagement options for the user, and responsive to a selection by the user of an engagement option in the list of engagement options, performing the step of transporting the avatar to the second virtual space.

13. The method of claim 10, wherein:
    the avatar is controllable by the user, and
    the avatar bot is controlled by at least one of the one or more VR servers or the virtual commerce server.

14. The method of claim 10, further comprising:
    querying, via the one or more VR servers or the virtual commerce server, the user for information from an agent avatar bot; and determining, via the one or more VR servers or the virtual commerce server, an estimated wait time at least in part based on data received from the querying of the user.

15. A method, comprising:
receiving, via one or more processors, an assistance request in a virtual store within a metaverse from an avatar;
generating, via the one or more processors, an avatar bot as a placeholder in a virtual queue within the virtual store, the virtual queue being a queue that is visually seen in the virtual store and is associated with the queue for a user to engage with an agent in the virtual store, the avatar bot being a virtual figure associated with the user and configured to represent the user in the virtual store;
transporting, via the one or more processors, the avatar to a virtual space that is separate from the virtual store, the virtual space within one of the metaverse or a second metaverse, the avatar associated with, and controllable by, the user, the avatar bot remaining associated with the user and automatically controllable by the one or more processors within the virtual store; and
transitioning, via the one or more processors, the avatar from the virtual space to the virtual store in response to one of the agents or a second agent being available or estimated as being available within a threshold period of time.

16. The method of claim 15, further comprising generating, via the one or more processors, a list of engagement options, and responsive to receiving a selection from the list of engagement options, transporting the avatar to the virtual space having a selected engagement option from the list of engagement options.

17. The method of claim 15, further comprising transmitting, via the one or more processors, communications from the agent through an agent avatar bot to the user while the user is controlling the avatar in the virtual space.

18. The method of claim 15, further comprising:
determining, via the one or more processors, an estimated wait time for the virtual queue based on at least one of a number of customers ahead in the virtual queue, a number of agents available, and an estimated task complexity; and
generating, via the one or more processors, a notification with the estimated wait time to the user prior to the generating the avatar bot as the placeholder in the virtual queue.

19. The method of claim 18, further comprising:
receiving, via the one or more processors, a confirmation from the user that the user agrees to be placed in the virtual queue after the notification is generated and prior to transporting the avatar to the virtual space;
receiving, via the one or more processors, registration information associated with the user in response to receiving the confirmation, the registration information configured to associate the user with the avatar and the avatar bot;
determining, via the one or more processors, one of the agents or the second agent is available or will be available within an estimated time threshold; and
performing the step of the transporting the avatar from the virtual store to the virtual space in response receiving an acceptance of a prompt from the user.

20. The method of claim 18, further comprising:
determining, via the one or more processors, one of the agents will be available within an estimated time threshold; and
performing the step of the transitioning the user from the avatar in the virtual space to replace the avatar bot in the virtual store automatically in response to an estimated time falling below the estimated time threshold.

* * * * *